(12) United States Patent
Mikes (10) Patent No.: US 10,819,927 B1
(45) Date of Patent: Oct. 27, 2020

(54) IMAGE SENSOR WITH SELF-TESTING BLACK LEVEL CORRECTION

(71) Applicant: OmniVision Technologies, Inc., Santa Clara, CA (US)

(72) Inventor: Gabor Mikes, Oslo (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/460,242

(22) Filed: Jul. 2, 2019

(51) Int. Cl.
| H04N 5/361 | (2011.01) |
| H04N 5/217 | (2011.01) |
| H04N 5/378 | (2011.01) |
| H04N 9/04 | (2006.01) |

(52) U.S. Cl.
CPC ........... *H04N 5/361* (2013.01); *H04N 5/2176* (2013.01); *H04N 5/378* (2013.01); *H04N 9/0455* (2018.08)

(58) Field of Classification Search
CPC .... H04N 5/361; H04N 9/0455; H04N 5/2176; H04N 5/378; H04N 5/36963
See application file for complete search history.

(56) References Cited

U.S. PATENT DOCUMENTS

| 6,144,408 | A | 11/2000 | MacLean |
| 8,274,715 | B2 | 9/2012 | Hamilton, Jr. et al. |
| 8,405,747 | B2 | 3/2013 | Mo et al. |
| 8,508,629 | B2 | 8/2013 | Mo et al. |
| 8,698,922 | B2 | 4/2014 | Zhang |
| 8,878,965 | B1 | 11/2014 | Chen et al. |
| 9,154,750 | B2 | 10/2015 | Pang |
| 10,154,213 | B2 * | 12/2018 | Yan ................. H04N 5/361 |
| 2009/0273691 | A1 * | 11/2009 | Mo .................. H04N 5/361 348/246 |
| 2018/0091748 | A1 * | 3/2018 | Yan ................. H04N 5/361 |

* cited by examiner

*Primary Examiner* — Nicholas G Giles
(74) *Attorney, Agent, or Firm* — Christensen O'Connor Johnson Kindness PLLC (57) ABSTRACT

An imaging system comprises an image sensor and black level correction (BLC) circuitry. The image sensor includes an image pixel array adapted to generate an image signal in response to incident light and a dark pixel array adapted to generate a black reference signal representative of a black level value of the image sensor. The BLC circuitry is adapted to adjust the image signal of the image pixel array based, at least in part, on the black reference signal of the dark pixel array. The BLC circuitry includes a plurality of measurement circuits to readout the black reference signal from the dark pixel array to determine the black level value of the image sensor. The BLC circuitry also includes a plurality of calculation circuits to calculate a BLC value based, at least in part, on the black level value determined from the plurality of measurement circuits.

21 Claims, 6 Drawing Sheets

IMAGE SENSOR WITH SELF-TESTING BLACK LEVEL CORRECTION

TECHNICAL FIELD

This disclosure relates generally to image sensors, and in particular but not exclusively, relates to black level calibration for image sensors.

BACKGROUND INFORMATION

Image sensors have become ubiquitous and are now widely used in digital cameras, cellular phones, security cameras, as well as, medical, automobile, and other applications. As image sensors are integrated into a broader range of electronic devices and their functionality continually expands, it is desirable to enhance the performance metrics of image sensors in as many ways as possible (e.g., resolution, power consumption, dynamic range, and the like) through both device architecture design as well as through post-image acquisition processing.

The typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge of each of the pixels may be measured as an output voltage of each pixel that varies as a function of the incident image light. In other words, the amount of image charge generated is proportional to the intensity of the image light, which is utilized to produce a digital image (i.e., image data) representing the external scene. However, the image sensor may generate an inaccurate representation of the external scene due to dark current influencing the image charge (e.g., adding to the output voltage) measured from the individual pixels of the image sensor, which may hinder the image sensor from producing digital images that faithfully reproduce the optical characteristics (e.g., intensity, color, and the like) of the external scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of an apparatus, system, and method for self-testing black level correction are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Over time, image sensors and/or their underlying components, circuitry, and the like may suffer from failure, degradation, or other errors that may not necessarily prevent operation of the image sensor, but may adversely influence the imaging quality when capturing digital images or videos. For example, degradation of the light shield utilized to form a dark pixel array for measuring black level values of the image sensor may result in inaccurate dark current measurement. Such degradation or failure may result in the external scene being inaccurately rendered since the black levels of an image sensor when imaging may vary depending on characteristics of the external scene (e.g., day and night scenes), operating conditions of the image sensor (e.g., temperature, exposure duration, etc.), and the like.

Thus, for any image sensor, but especially for image sensors tasked with providing imaging during low light conditions such as automotive and surveillance image sensors, it is desirable to have a well-defined and accurate black level such that the digital image or video produced by the image sensor faithfully reproduces the optical characteristics of the external scene. In applications where there is an increased exposure time due to low light conditions, the temperature is in the high end of the image sensor's operating range, or other such conditions in which there is a low signal-to-noise ratio (e.g., with respect to the image signal and black level) the effect of dark current may become readily apparent and should be accurately determined. Failure to do so may result in an inaccurate representation of the external scene (e.g., the image sensor may have a reduced dynamic range resulting in details of the external scene, such as locations of pedestrians, objects, and the like, being obscured).

Described herein are embodiments of an apparatus, an imaging system, and a method that may be utilized for providing self-testing black level correction of image data (e.g., image signals generated by an image sensor in response to incident light). In particular, embodiments of the disclosure provide comprehensive checks and redundancies that may be advantageously used to determine whether the measured dark current accurately represents the black level of the image sensor. Specifically, in embodiments, a reset and rotate scheme is utilized during black level correction to self-test failure or degradation of individual black level measurement circuits, calculation circuits, as well as the rotate scheme itself. In the same or other embodiments, additional features may include a channel balance check to determine whether a difference between the black level value associated with different color channels of the image sensor are within a channel balance threshold, a flicker check to check for frame-to-frame consistency of black level correction values, and a sanity check to determine whether the black level value is within an expected black level range based on operational parameters of the image sensor. Advantageously, individually and/or collectively, the features of the embodiments described herein may enable continuous frame-by-frame self-testing of the black level correction when capturing digital images or video with an image sensor.

Figure 1A:
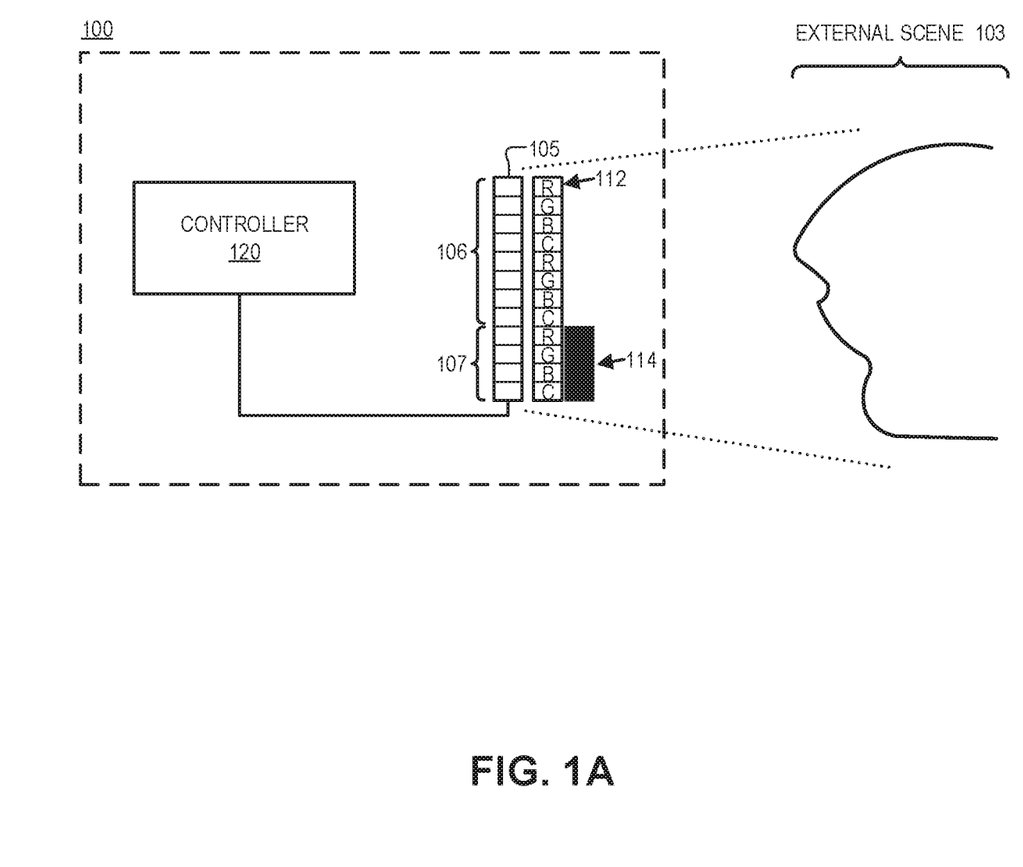
FIG. 1A is a functional block diagram illustrating an imaging system including an image pixel array optically coupled to a color filter array to capture a digital image or video of an external scene, in accordance with the teachings of the present disclosure.

FIG. 1A illustrates a functional block diagram of an imaging system 100 including an image pixel array 106 optically coupled to a color filter array 112 to capture a digital image or video of an image or video of an external scene 103. The illustrated embodiment of the imaging system 100 includes pixel array 105, the color filter array 112, light shield 114, and controller 120. The pixel array 105 includes a plurality of individual pixels (e.g., photodiodes, photosensors, and the like) including a two-dimensional ("2D") image pixel array 106 and dark pixel array 107 that collectively correspond to an image sensor of the imaging system 100. In the illustrated embodiment, a portion of the individual pixels included in the pixel array 105 that are optically coupled with color filter 112, but not shielded from incident light by light shield 114 form the image pixel array 106. The color filter array 112 includes a plurality of color filters (e.g., red, green, and blue) and panchromatic filters (e.g., clear, transparent, unfiltered, etc.) each associated with at least an individual one of the pixels included in pixel array 105. In other words, each pixel in both the image pixel array 106 as well as the dark pixel array 106 may be associated with at least one of the color channels (e.g., red, green, blue, panchromatic) of the imaging system 100. More specifically, the plurality of color filters and panchromatic filters of the color filter array 112 are arranged in a tileable manner with a minimal repeat unit (e.g., RGBC as illustrated, which corresponds to a red, green, blue, and clear filter) to form a plurality of pixel clusters of the image pixel array 106. Each of the pixel clusters may correspond to a full color pixel of the image pixel array 106 that may be utilized to generate image signals that collectively are representative of the external scene 103.

Groups of the image signals generated by the image pixel array 106 are associated with a respective one of the pixel clusters. Each of the groups of the image signals includes a plurality of color signals and a panchromatic signal, which cumulatively is representative of a color and intensity of the corresponding pixel cluster. Each of the pixel clusters captures a plurality of color signals included in the image signals, which in combination, are representative of the spectrum of visible light. More specifically, the color filters of each of the pixel clusters include at least one filter each of primary (e.g., red, green, and blue) or secondary (e.g., cyan, magenta, and yellow) color filters that additively cover the spectrum of visible light. In the illustrated embodiment, individual pixels of the image pixel array 106 optically coupled to a red color filter ("R") of the color filter array 112 correspond to red pixels and capture color signals representative of the intensity of red light in the external scene 103. Similarly, individual pixels optically coupled to a blue color filter ("B") or a green color filter ("G") correspond to blue or green pixels and capture color signals representative of the intensity of blue or green light of the external scene 103, respectively. Each of the pixel clusters also includes at least one individual pixel optically coupled to a panchromatic filter (e.g., clear, transparent, unfiltered) that captures a panchromatic signal representative of the intensity of the spectrum of unfiltered visible light (e.g., white light). Thus, collectively, each of the pixel clusters capture image signals including a plurality of color signals and a panchromatic signal, which are utilized to determine a color and a color intensity of a portion of the external scene 103.

It is appreciated that the specific color filter array 112 is merely illustrative and should not be deemed limiting. Rather, the RGBC color filter array is merely an example of one possible color filter array configuration that may be implemented in accordance with the teachings of the present disclosure. In other embodiments, different arrangements of individual filters may be utilized including, but not limited to, Bayer filters (e.g., a 2×2 minimal repeat unit with one red, one blue, and two green color filters), CYYM (e.g., a 2×2 minimal repeat unit with one cyan, one magenta, and two yellow filters), or various other combinations of one or more filters to make up the one or more color channels of the image sensor and/or imaging system (e.g., red, green, blue, panchromatic, cyan, magenta, yellow, ultraviolet, infrared, or otherwise). Further still, it is appreciated that in some embodiments the image sensor of the imaging system 105 is a monochromatic image sensor with only a single color channel. Additionally, it is noted in some embodiments, the image sensor is not limited to generating image signals representative of only the visible range of the electromagnetic spectrum and that in some embodiments the imaging system 100 may also include color channels outside of the visible range, including, but not limited to, the ultraviolet range (e.g., a wavelength between 10 nm and 400 nm) and/or the infrared range (e.g., a wavelength from 700 nm to 1 mm).

The dark pixel array 107 of pixel array 105 is optically coupled to light shield 114 with a portion of the color filter array 112 disposed between the individual pixels of the dark pixel array 107 and the light shield 114. The light shield 114 optically shields (e.g., via an opaque metal layer or other material structured to have substantially near zero transmission of light within the spectral response range of the image sensor) at least the photosensitive region of the individual pixels included in the dark pixel array 107 from being exposed to incident light. Rather than generate signals based on incident light, the dark pixel array 107 generates one or more black reference signals based on the dark current of the individual pixels within the dark pixel array 107. In other words, the black reference signal is representative of the black level value of the image sensor and/or imaging system (i.e., pixel array 105) that may be utilized to correct the image signals from image pixel array 106. In some embodiments, the black reference signal is a multi-channel signal, with each of the individual channels associated with a corresponding color channel of the imaging system 105. For example, in the illustrated embodiment, the color filter array 112 is disposed between the dark pixel array 107 and the optical shield 114, meaning the black reference signal may include individual channels associated with the black level values of red pixels, green pixels, blue pixels, and panchromatic pixels (i.e., a corresponding color channel included in a plurality of color channels of the imaging system 100). The one or more black reference signals may subsequently be utilized to determine the black level value of imaging system 100 for correcting the image signals generated by the image pixel array 106 (e.g., on a per color channel basis).

It is appreciated the dark current associated with each of the plurality of color channels of the imaging system 100 are expected to be similar. For example, while the black reference signal may include individual channels each associated with a particular color channel of the imaging system 100, the black level value of a particular image frame or exposure of captured by the imaging system 100 may be determined based on the composite black reference signal (e.g., an average of the individual channels of the black reference signal at a particular time when the image frame or exposure was captured). Advantageously, measuring dark current of individual pixels on a per color channel basis enables performing a channel balance check to determine whether a difference (e.g., a comparison) between the black level value for each of the individual color channels are within a channel threshold, which may be indicative of failure or degradation of components of imaging system 100.

Figure 1B:
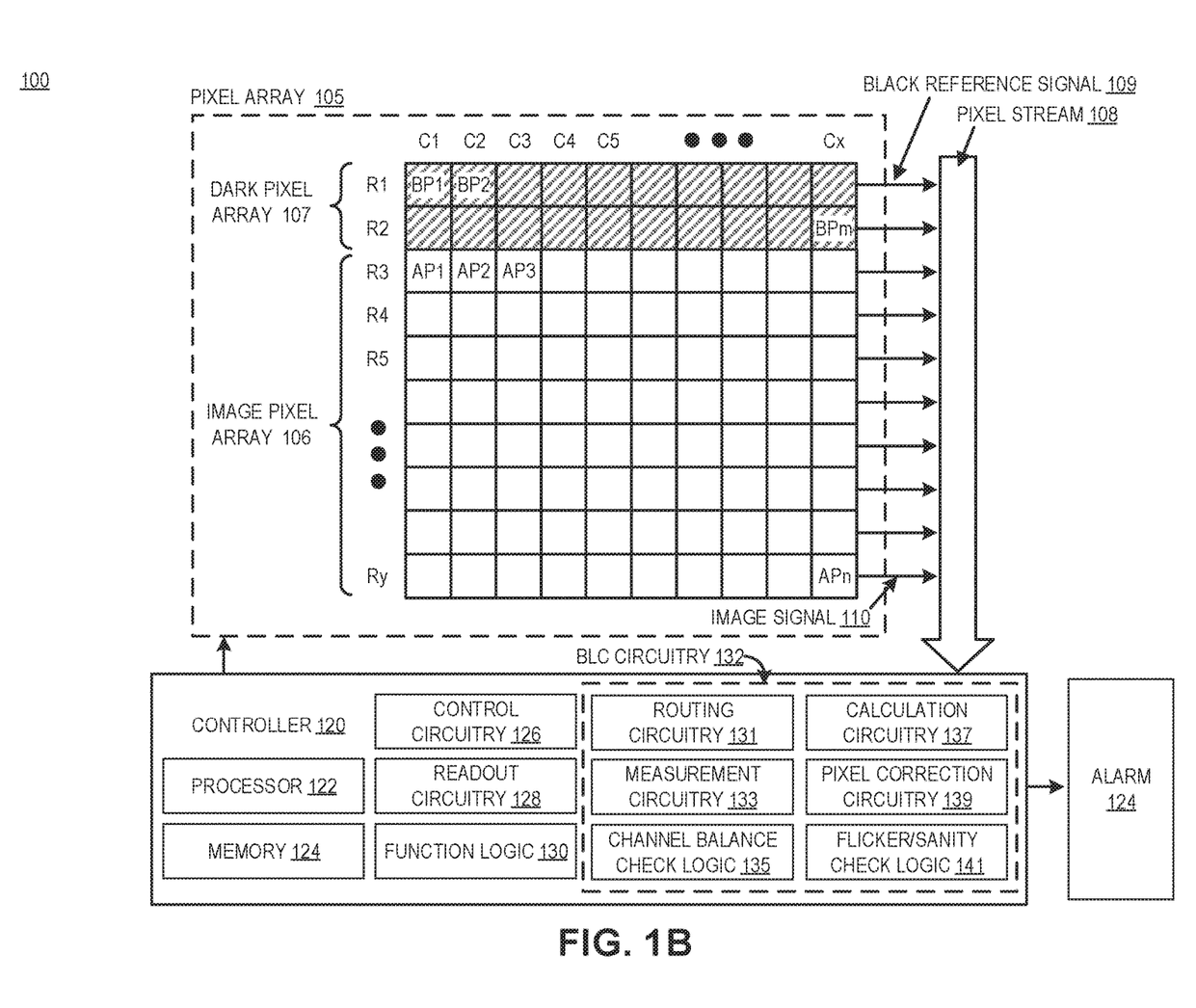
FIG. 1B is a functional block diagram of an imaging system with self-testing black level correction, in accordance with the teachings of the present disclosure.

FIG. 1B illustrates a more detailed view of the functional block diagram of the imaging system 100 with self-testing black level correction, in accordance with the teachings of the present disclosure. The illustrated embodiment of the imaging system 100 includes pixel array 105, controller 120, and alarm 124. The imaging system 100 also includes the color filter array 112 and light shield 114 (as illustrated in FIG. 1A), which have been omitted to prevent obscuring certain aspects. The pixel array 105 includes the image pixel array 106 and the dark pixel array 107. The controller 120 includes processor 122, memory 124, control circuitry 126, readout circuitry 128, function logic 130, and black level correction (BLC) circuitry 132. The BLC circuitry 132 includes routing circuitry 131, measurement circuitry 133, channel balance check logic 135, calculation circuitry 137, pixel correction circuitry 139, and flicker/sanity check logic 141.

The illustrated embodiment of the pixel array 105 includes a two-dimensional ("2D") array of individual pixels with form the image pixel array 106 and the dark pixel array 107. As described previously in reference to FIG. 1A, a first portion of the individual pixels of pixel array 105 that are positioned to receive incident light of an external scene (i.e., not blocked by light shield 114 as illustrated in FIG. 1A) form the image pixel array 106. The individual pixels of the image pixel array 106 are referred to as "active pixels" or "image pixels" and are denoted in FIG. 1B as AP1, AP2, AP3, . . . , APn based on their specific row and column placement within the pixel array 105. Specifically, the image pixels are adapted to capture one or more image signals that are collectively representative of an external scene (e.g., the external scene 103 of FIG. 1A) in response to incident light. A second portion of the individual pixels of pixel array 105 that are positioned to be substantially shielded from incident light (e.g., by light shield 114 illustrated in FIG. 1A) to form the dark pixel array 107, which includes a plurality of individual black reference pixels (BP0, BP1, . . . , BPn) for capturing one or more black reference signals representative of a black level value of the imaging system 100. In one embodiment, each of the image pixels is an active pixel sensor, such as a complementary metal oxide image sensor pixel. In some embodiments, the individual black reference pixels include a similar or identical structure to that of either active pixel counterparts with at least one exception being that they are shielded from receiving light by a light blocking layer (e.g., the illustrated light shield 114 of FIG. 1A).

As illustrated in FIB. 1B, each of the individual pixels in the pixel array 105 is arranged in a row (e.g., rows R1 to Ry) and a column (e.g., columns C1 to Cx). The image pixels are adapted or otherwise configured (e.g., by virtue of being exposed to incident light and optically coupled to a color filter) to acquire image data (e.g., image signals) of an external scene (e.g., a person, place, or object) which can then be used to render a digital image or video of the external scene. However, the image signals may be influenced, at least in part, due to the dark current that may be present when acquiring the image data. The individual black reference pixels of the dark pixel array 107 are arranged in a comparatively similar array as the image pixels to capture one or more black reference signals that are representative of the dark current within the image pixels when capturing digital images or videos of the external scene. In the illustrated embodiment, the individual black reference pixels are denoted as BP0 through BPm aligned in two rows above the image pixel array 106. The individual black reference pixels are shielded from light and can be used to capture one or more black reference signals for determining a black level value of the imaging system 100. The black reference signal may be a multi-channel signal, which each of the individual channels of the black reference signal associated with a corresponding one of the color channels of the imaging system 100. For example, black pixel "BP1" may be optically coupled to a red color filter meaning the black level value associated with BP1 may be subsequently associated with the red color channel of the imaging system 100. In other words, the black level value for each of the one or more color channels of the imaging system 100 may be determined from the black reference signal and used for black level correction of the image signals. It is appreciated that the illustrated configuration of the pixel array 105 is just one embodiment of many possible configurations. In other embodiments, the dark pixel array 107 may be formed in other regions of the pixel array 105, such as the center of the pixel array 105, or even run along two opposing sides of the image pixel array 106. In some embodiments the dark pixel array 107 may share common rows or columns as the image pixel array 106.

As illustrated, when imaging system 100 is capturing a digital image or video of an external scene, a pixel stream 108 may be generated which includes one or more black reference signals 109 and one or more image signals 110 on a per image frame (or per exposure frame in embodiments where a multi-exposure high dynamic range image frame is being captured) basis. Each of the black reference signals may correspond to the black level value(s) of the image frame. Specifically, the black reference signal may include one or more individual channels that are respectively associated with a corresponding one of the color channels of the imaging system 100 (e.g., based on the specific color positioned between the black reference pixel and the light shield). Individual black reference pixels of the dark pixel array 107 may generate a dark current or voltage value (e.g., based, at least in part, on the current-voltage curve of the black reference pixel when capturing the image frame) that may be subsequently averaged or otherwise used to determine the black level value for each of the color channels of the image frame for the imaging system 100. The one or more image signals 110 may each respectively correspond to an image pixel of the image pixel array 106, which may accumulate image charge (i.e., voltage/current) representative of an intensity of light for a portion of the external scene that is associated with a color channel of the imaging system 100 (e.g., based, at least in part, on the respective type of color filter disposed between the individual image pixel and the external scene as illustrated in FIG. 1A).

Each of the individual pixels of pixel array 105 may be addressed and readout (e.g., via the readout circuitry 128 and/or the measurement circuitry 133) individually. In the illustrated embodiment of the imaging system 100 in FIG. 1B, each row of the pixel array 105 is read out consecutively (e.g., from R1 to Ry), which the black reference signal 109 being read out first to subsequently used the black level value determined from the black reference signal 109 (e.g., from rows R1 and R2) to correct the image signals 110 from subsequent rows (e.g., R3 through Ry). In other embodiments, a global shutter may be utilized in which each of the individual pixels of pixel array 105 are readout simultaneously and thus black level correction may correct after image acquisition.

The controller 120 includes logic and/or circuitry to control the operation (e.g., during pre-, post-, and in situ phases of image and/or video acquisition including, but not limited to, black level correction and the like) of the various components of the imaging system 100. The controller 120 may be implemented as hardware logic (e.g., application specific integrated circuits, field programmable gate arrays, system-on-chip, etc.), software/firmware logic executed on a general purpose microcontroller or microprocessor, or a combination of both hardware and software/firmware logic. In one embodiment, the controller 120 includes the processor 122 coupled to memory 124 that store instructions for execution by the controller 120 or otherwise by one or more components of the imaging system 100. The instructions, when executed by the controller 120, may cause the imaging system 100 to perform operations that may associated with the various functional modules, logic blocks, or circuitry of the imaging system 100 including any one of, or a combination of, the control circuitry 126, the readout circuitry 128, the function logic 130, the black level correction circuitry 132 (e.g., the routing circuitry 131, the measurement circuitry 133, the channel balance check logic 135, the calculation circuitry 137, the pixel correction circuitry 139, and/or the flicker/sanity check logic 141), alarm 124, and any other element of imaging system 100 (illustrated or otherwise, such as one or more interface devices coupled to alarm 124). The memory is a non-transitory computer-readable medium that may include, without limitation, a volatile (e.g., RAM) or non-volatile (e.g., ROM) storage system readable by controller 120. It is further appreciated that the controller 120 may be a monolithic integrated circuit, one or more discrete interconnected electrical components, or a combination thereof. Additionally, in some embodiments the one or more electrical components may be coupled to one and others that collectively function as the controller 120 to orchestrate operation of the imaging system 100.

In the illustrated embodiment, the various logic and/or circuitry modules 122-141 of controller 120 are utilized to capture an image or video of an external scene (e.g., represented by one or more image signals that are each associated with a corresponding pixel of the image pixel array 106) and subsequently correct one or more of the image signals on a per pixel basis based, at least in part, on a black level value associated with the corresponding color channel of the imaging system 100 determined from one or more black reference signals of the dark pixel array 107. Advantageously, the correction of the image signals on a per pixel basis is self-tested (e.g., for increased accuracy of the determined black level value) on a per image frame basis such that degradation, circuitry failure, faults, or other adverse conditions may be detected.

Control circuitry 126 may control operational characteristics of the image pixel array 106 and dark pixel array 107 (e.g., exposure duration, when to capture digital images or videos, and the like). Readout circuitry 128 reads or otherwise samples the analog signal from the individual pixels (e.g., to capture an image frame) and may include amplification circuitry, analog-to-digital (ADC) circuitry, image buffers, or otherwise. In the illustrated embodiment, readout circuitry 128 is included in controller 120, but in other embodiments readout circuitry 128 may be separate from the controller 120. Function logic 130 may store the black reference signals, black level values, black level correction values, image signals, and/or corrected image signals. In some embodiments, the image signals and/or corrected image signals may be stored as image data and may be manipulated by the function logic 130 (e.g., to apply post image effects such as crop, rotate, remove red eye, adjust brightness, adjust contrast, or otherwise).

Black level correction (BLC) circuitry 132 provides self-testing black level correction of the image signals 110 (e.g., acquired by readout circuitry 128). Routing circuitry 131 (e.g., one or more multiplexers, demultiplexers, logic systems, or otherwise) that selectively and dynamically assigns the individual channels of the black reference to a plurality of measurement circuits (i.e., the measurement circuitry 133) and/or selectively and dynamically assigns the measured black level values to a plurality of calculation circuits (e.g., the calculation circuitry 137). The measurement circuitry 133 includes the plurality of measurement circuits (e.g., readout circuitry which may include amplification circuitry, ADC circuitry, and the like) that may each be utilized to sample or otherwise readout the black reference signal 109 when capturing digital images and/or video. In some embodiments, the measurement circuitry 133 may be part of or otherwise included in the readout circuitry 128. The channel balance check logic 135 may be coupled to alarm 124 and utilized to check differences in accumulated black level (and zero level) values between color channels of the imaging system 100 (e.g., on a per image frame basis) and assert an error flag (e.g., received by alarm 124) when the difference (e.g., absolute difference) between any (e.g., two) channels is higher than a programmed threshold (e.g., channel balance threshold). The calculation circuitry 137 includes a plurality of calculation circuits (e.g., two or more) to calculate black level correction values for each of the image signals on a per color channel basis or otherwise. The pixel correction circuitry 139 is utilized to adjust (e.g., correct) the image signals 110 based, at least in part, on the calculated black level correction values. The flicker/sanity check logic 141 provides a flicker check to check frame-to-frame consistency of the black level correction values as well as a sanity check to verify that an average black level value (e.g., an average of the black level value for multiple image frames and/or color channels) is within an expected range based on the operating parameters (e.g., exposure duration, temperature, and gain) of the imaging system 100.

Figure 2:
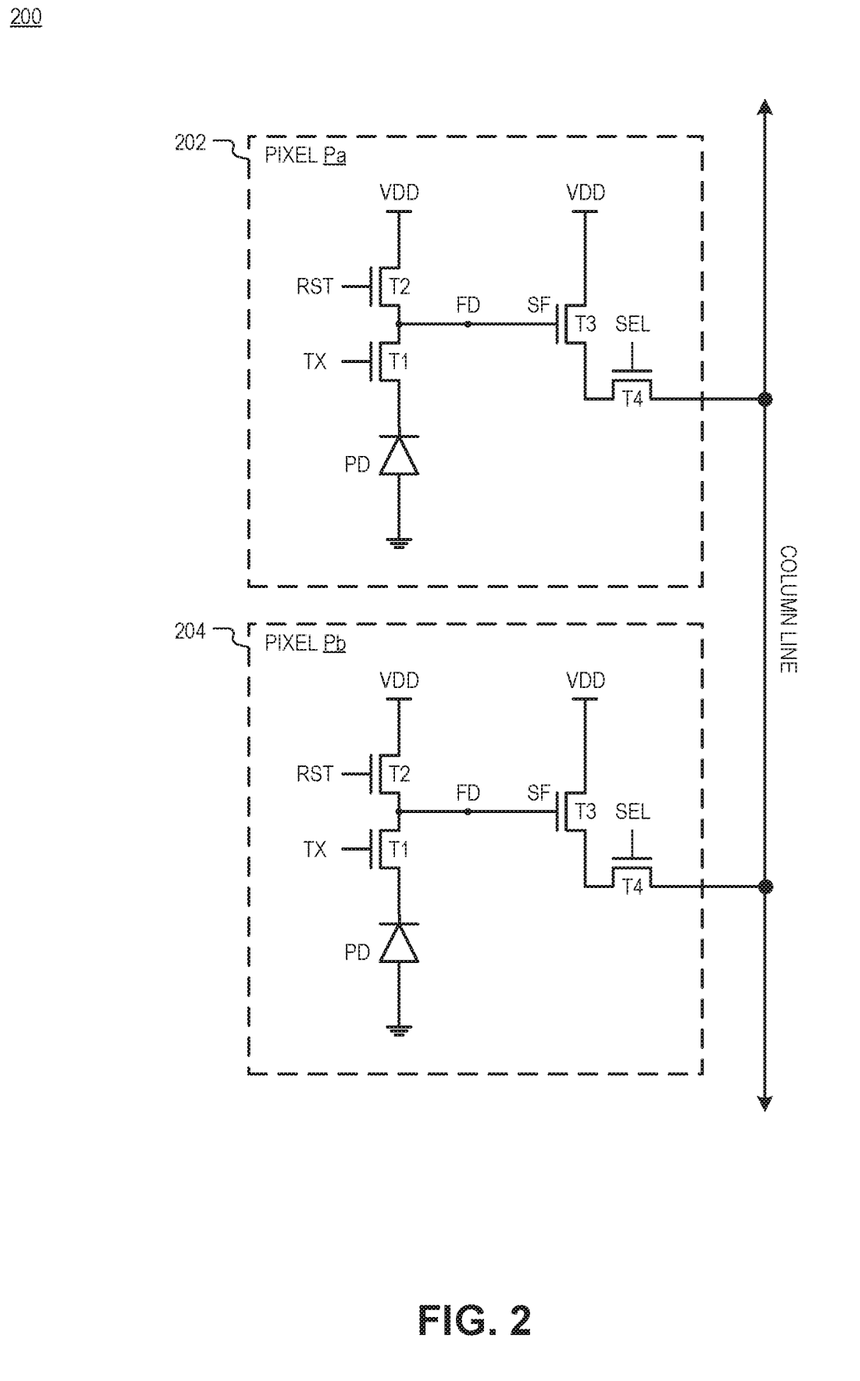
FIG. 2 is a circuit diagram illustrating pixel circuitry for two four-transistor pixels, which may be included in the imaging system of FIGS. 1A-1B, in accordance with the teachings of the present disclosure.

FIG. 2 is a circuit diagram 200 illustrating pixel circuitry for two four-transistor pixels 202 (pixel Pa) and 204 (pixel Pb), which may be included in the imaging system 100 of FIGS. 1A-1B, in accordance with the teachings of the present disclosure. The pixels Pa and Pb are arranged in two rows and one column. The illustrated embodiment of each pixel in pixel circuitry 200 includes a photodiode PD, a transfer transistor T1, a reset transistor T2, a source-follower ("SF") transistor T3, and a select transistor T4. During operation, transfer transistor T1 receives a transfer signal TX, which transfers the charge accumulated in photodiode PD, in response to incident light, to a floating diffusion node FD. In one embodiment, the floating diffusion node FD can be coupled to a storage capacitor for temporarily storing image charges (not illustrated). Reset transistor T2 is coupled between a power rail VDD and the floating diffusion node FD to reset (e.g., discharge or charge the FD to a preset voltage) under control of a reset signal RST. The floating diffusion node FD is coupled to control the gate of SF transistor T3. SF transistor T3 is coupled between the power rail VDD and select transistor T4. SF transistor T3 operates as a source-follower providing a high impedance output from the pixel. Finally, select transistor T4 selectively couples the output of pixel circuitry 200 to the column readout line (also referred to as a bit line or a data bit line) under control of a select signal SEL. The data readout from the pixel onto the bit line is an analog signal, which may be received by readout circuitry (e.g, readout circuitry 128 of FIG. 1B) measurement circuitry (e.g., measurement circuitry 133 of FIG. 1B), or the like for conversion to a digital signal (e.g., image signals and/or black reference signals). In one embodiment, the TX signal, the RST signal, and the SEL signal are generated by control circuitry (e.g., the control circuitry 126 included in the controller 120 illustrated in FIG. 1B).

Figure 3:
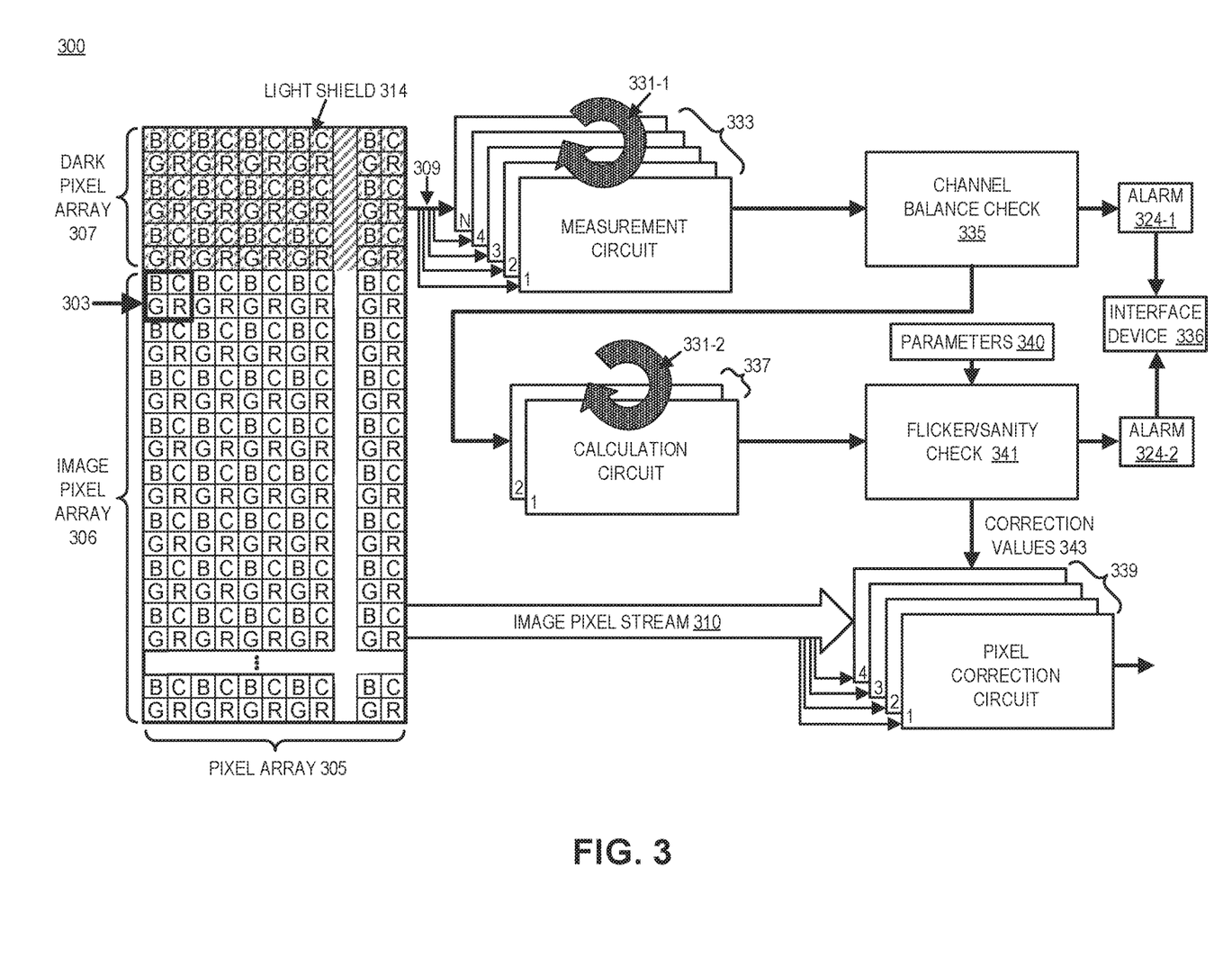
FIG. 3 is a functional block diagram illustrating an imaging system performing a process of self-testing black level correction, in accordance with the teachings of the present disclosure.

FIG. 3 is a functional block diagram illustrating an imaging system (e.g., imaging system 100 illustrated in FIGS. 1A-1B) performing a process 300 of self-testing black level correction, in accordance with the teachings of the present disclosure. The imaging system may correspond to the imaging system 100 illustrated in FIGS. 1A-1B and may include the same or similar features. Illustrated in FIG. 3, pixel array 305 is one possible implementation of pixel array 105 of FIGS. 1A-1B for the imaging system 100. Referring back to FIG. 3, pixel array 305 includes an image pixel array 306 (e.g., which corresponds to image pixel array 106 of FIGS. 1A-1B) including a plurality of pixel clusters (e.g., first pixel cluster 303) with the individual image pixels (e.g., AP1, AP2, AP3, APn of FIG. 1B) of the image pixel array 306 adapted to generate one or more image signals in response to incident light (i.e., image pixel stream 310) that are representative of an external scene. The pixel array 305 also includes a dark pixel array 307 (e.g., which corresponds to dark pixel array 107 of FIGS. 1A-1B) including a plurality of black pixels (e.g., BP1, BP2, BPm of FIG. 1B) adapted to generate a black reference signal 309 representative of a black level value of the imaging system associated with the image frame being captured. In the illustrated embodiment, each of the individual pixels of pixel array 305 are coupled to individual filters (e.g., red, green blue, and panchromatic filters) of a color filter array (e.g., color filter array 112 of FIG. 1A) meaning the generated signals (e.g., the black reference signal 309 and image signals included in the image pixel stream 310) are each associated with one of the color channels of the image frame being captured with the imaging system and may be utilized for black level correction.

The color channel relationship between the individual pixels of the pixel array 305 and the color channels of the imaging system are based, at least in part, on the color filter array (e.g., which may correspond to the color filter array 112 of FIG. 1A) which is overlaid between the individual pixels and the external scene. For example, in the illustrated embodiment of FIG. 3, the imaging system has four color channels (red, green, blue, and panchromatic). It is appreciated that in some embodiments the panchromatic color channel may be a color channel of the imaging system, but may ultimately not end up as a color channel of the black level corrected image (e.g., once the image signals are digitized, corrected, and may be subsequently transformed in the RGB color space). The color filter array has a minimal repeat unit that forms a plurality of pixel clusters (e.g., pixel cluster 303) that generate image signals that collectively are representative of a full color spectrum value of a portion of the external scene. In the illustrated embodiment, an RGBC color filter array is utilized, in which each pixel cluster corresponds to an array of individual pixels including at least one red "R" pixel, one green "G" pixel, one blue "B" pixel, and one panchromatic "C" pixel adjacently located next to one another (e.g., the first pixel cluster 303 comprising a 2×2 array of individual pixels). While the illustrated embodiment of image pixel array 306 includes an RGBC color filter with a 2×2 minimal repeat unit, it is appreciated that other color filter arrays and minimal repeat units may also be utilized (e.g., RGBC color filter array with a minimal repeat unit of an array of 2×4, 4×4, or otherwise of individual pixels and a color filter array with additional or other filters such as cyan, magenta, yellow, ultraviolet, or infrared filters). In some embodiments, there may be two color channels of the imaging system associated with the same color channel. For example, in one embodiment in which a Bayer color filter is used, there may be one red, one blue, and two green color channels. In other embodiments, the color channels of an imaging system using a Bayer color filter may only have one red, one blue, and one green color channel (i.e., the two greens are associated with the same color channel being readout). It is also appreciated that in some embodiments, the minimal repeat unit of the color filter array may not necessarily define a pixel cluster (e.g., the minimal repeat unit of the color filter array be a 2×2 array of filters, but an individual pixel cluster may correspond to a 4×6 or 6×6 array of individual pixels).

Each of the individual pixels of the image pixel array 306 generate image signals which are grouped together based on their association with a respective one of the pixel clusters (e.g., image signals from the red, green, blue, and clear pixels included in the first pixel cluster 303 may form a first group of image signals included in the groups of image signals). In the illustrated embodiment, groups of image signals associated with each one of the pixel clusters include a plurality of color signals (e.g., red, green and blue color signals) and at least one panchromatic signal, which are measured, respectively, from the red, green, blue, and clear pixels of a corresponding one of the pixel clusters (e.g., the first pixel cluster 303).

The pixel array 305 also includes the dark pixel array 307, which corresponds to the dark pixel array 107 of FIGS. 1A-1B. Referring back to FIG. 3, each of the individual pixels included in the dark pixel array 307 are optically coupled to the color filter as well as to light shield 314 (e.g., light shield 114 of FIG. 1A) to generate one or more black reference signals (e.g., as shown in FIG. 1A). In some embodiments, there is only one black reference signal per image frame, which may be a multi-channel signal, each of the individual channels associated with a respective color channel of the imaging system based on the color filter disposed between the individual pixels of the dark pixel array 307 and the light shield 314. Accordingly, when acquiring an image frame, dark current may be collected (i.e., accumulated) for each of the individual channels of the black reference signal and may subsequently be utilized for adjusting the image signals generated by the image pixel array 306 on a per color channel basis.

Process 300 is a method for self-testing black level correction to remove black level error, which may arise when capturing images with an imaging system (e.g., imaging system 100 illustrated in FIGS. 1A-1B) in low light conditions, operating at elevated temperatures, or otherwise be present during operation of the imaging system. In the illustrated embodiment, process 300 is applied on a frame-by-frame basis. In other words, the black level correction is updated for each frame captured by the imaging system and subsequently used to correct for black level error resultant of dark current present within the image signals. It is appreciated that for high dynamic range (HDR) image frames, multiple exposures may be generated for forming the HDR image. In such embodiments, the black level correction may be accomplished for each of the exposure frames that collectively form the HDR image frame. More specifically, the process of block level correction as described by process 300 is a self-testing process in which built-in redundancies and checks effective enhance test coverage to cover failure and/or degradation at the component level of the imaging system.

Process 300 illustrates a method of self-testing black level correction, in accordance with an embodiment of the present disclosure. Process 300 is one possible implementation an imaging system (e.g., imaging system 100 illustrated in FIGS. 1A-1B) may use for self-testing black level correction. It is appreciated that the numbered blocks of process 300, including blocks 331-341, may occur in any order and even in parallel. Additionally, blocks may be added to, or removed from, process 300 in accordance with the teachings of the present disclosure.

In the illustrated embodiment, process 300 may initialize upon receipt of a signal (e.g., a depressed shutter button of the imaging system) to capture an image frame representative of an external scene in which the black reference signal 309 representative of a black level value of the image sensor (or overall imaging system) and the image pixel stream 310 (including a plurality of image signals) representative of the external scene are acquired (e.g., as analog signals). The black reference signal 309 includes one or more individual channels, with each of the individual channels associated with a respective one of the one or more color channels of the image signal (e.g., as dictated by the filters disposed between the individual black pixels of the dark pixel array 307 and the light shield 314). More specifically, in the illustrated embodiment of FIG. 3, the black reference signal 309 is a multi-channel image signal with individual channels corresponding to the red, green, blue, or panchromatic color channels of the pixel array 305.

Block 331-1 illustrates utilizing a reset and rotate scheme to selectively assign (e.g., via first routing circuitry included in routing circuitry 131 coupled to the pixel array 105 of the image sensor and the measurement circuits 133 illustrated in FIG. 1B) the one or more individual channels of the black reference signal to individual measurement circuits included in a plurality of measurement circuits (e.g., measurement circuits 133 illustrated in FIG. 1B) for readout (e.g., accumulate dark current/black level value of the imaging system) of the black reference signal 309 when capturing the image frame. More specifically, a total number of the plurality of measurement circuits is greater than a total number of the color channels of the image sensor (e.g., an imaging system with red, green, blue, and panchromatic color channels may have at least five measurement circuits) to enable frame-by-frame selective assignment in which at least one of the measurement circuits is inactive during the readout of the black reference signal when capturing an image frame.

Block 333 shows reading out (e.g., sampling) the black reference signal with the plurality of measurement circuits associated with the image frame to determine the black level value of the image sensor/imaging system. In the illustrated embodiment the individual measurement circuits (e.g., readout circuitry) of a plurality of measurement circuits (e.g., measurement circuits 1, 2, 3, 4, . . . , N) are utilized to accumulate analog values (e.g., dark current/voltage) and digitize the accumulated analog values associated with the black level and/or zero level of the individual channels of the black reference signal 309. Advantageously, utilizing the selective assignment of the individual channels of the black reference signal 309 to the plurality of measurement circuits, while keeping at least one of the measurement circuits inactive due to the relative total size difference between the total number of color channels (and thus individual channels of the black reference signal 309) and the total number of measurement circuits, enables self-testing coverage of components associated with both the individual measurement circuits and the circuitry associated with the reset and rotate scheme (e.g., the routing circuitry).

Block 335 illustrates receiving the black level value of the image frame captured by the image sensor of the imaging system and performing a channel balance check (e.g., via channel balance beck logic coupled to an interface device 336) to assert an alarm signal when a comparison between the black level value for each of the plurality of color channels associated with the image frame of the image sensor is outside a channel balance threshold (e.g., an absolute difference in black level value between any of the color channels is higher than a programmed threshold). Several modes of failure may be covered by checking if the difference between black level value of any of the color channels is outside of the channel balance threshold including, but not limited to, failure of the routing circuitry (e.g., associated with block 331-1), failure or degradation of one or more, but not necessarily all, of the measurement circuits (e.g., associated with block 333), and/or the dark pixel array 307 being compromised unevenly across the individual channels (e.g., uneven degradation of the light shield 314).

When the channel balance check results in a comparison between the black level value for each of the plurality of color channels associated with the image frame of the image sensor or system being outside of the channel balance threshold, the channel balance check logic asserts an alarm signal, indicated by block 324-1, that is received by interface device 336 to provide an indication of an error occurrence to a user of the imaging system when the alarm signal is asserted. In other words, when there is an indication of some type of component failure or degradation resulting in inaccurate black level values, the user is notified. In some embodiments, the interface device 336 may be an optical device (e.g., an indicator light on the dash of a vehicle), an audible device (e.g., an error sound emitted from a speaker), a memory device (e.g., the alert is flagged in memory to be readout by an individual at a later time such as when the vehicle is not actively moving), or any other type of device that may be utilized to inform a user immediately, after a set period of time, during a diagnostic check, or otherwise of the alarm signal.

Upon completion of the channel balance check (or in parallel with), the determined black level values of each of the individual channels of the black reference signal 309 selectively assigned (e.g., via second routing circuitry included in routing circuitry 131 coupled to calculation circuitry 137 as illustrated in FIG. 1B) individual calculation circuits included in the plurality of calculation circuits to calculate a black level correction (BLC) value. More specifically, the reset and rotate scheme utilized to calculate the BLC value is utilized to provide increased self-testing coverage by alternating (in cases of only two calculation circuits) or otherwise preventing the same calculation circuit from being used to calculate the BLC value for successive image frames. Calculating the BLC value may include, but not be limited to, averaging the respective black level values associated with each of the color channels of a given image frame (e.g., averaging the black level values associated with all black pixels coupled to a red color filter to determine the average black level value for the red color channel of the image system), generating an average of the black level values (e.g., across all color channels and/or multiple frames), performing statistical analysis of the black level values (e.g., filtering black level values in a pre-determined manner such as removing outliers), or otherwise. In some embodiments, at least one of the calculation circuits is inactive when computing the BLC value of the image frame. Advantageously, utilizing the selective assignment of the individual calculation circuits included in the plurality of calculation circuits to determine the BLC value enables self-testing coverage of components associated with both the individual measurement circuits, the circuitry associated with the reset and rotate scheme (e.g., the routing circuitry), and the dark pixel array.

Block 341 illustrates receiving the corrected black level values (e.g., BLC values) of the image frame captured by the imaging system and performing a flicker check and a sanity check in series or parallel (e.g., via flicker/sanity check logic coupled to interface device 336) to assert an alarm signal based on the outcome of the flicker check and/or sanity check.

The flicker check provides a check of frame-to-frame consistency for each BLC value (e.g., on a per color channel basis). More specifically, an alarm signal is asserted when a comparison of the BLC value between successive image frames results in a difference outside of a flicker threshold. In other words, when the frame-to-frame change of the BLC value for a given color channel of the imaging system is higher (or otherwise outside of) a programmed threshold the alarm signal is generated (e.g., as illustrated in block 342-2) and passed to the interface device 336 to provide an indication of an error occurrence to a user of the imaging signal when the alarm signal is asserted. In some embodiments, the flicker check is a strict rule that allows for small frame-to-frame variance (e.g., relative change in BLC value between successive image frames may be less than 10%, 5%, 1% or some other programmed threshold) to catch marginal failure of individual components (e.g., minor inaccuracies). Several modes of failure or degradation may be covered by checking if the difference between the BLC value of any of the color channels is outside of the flicker threshold including, but not limited to, failure of any of the routing circuitry (e.g., associated with block 331-1 and/or 331-2), failure or degradation (including marginal failure resulting in minor inaccuracies) of one or more, but not necessarily all, of the measurement circuits (e.g., associated with block 333), failure or degradation (including marginal failure resulting in minor inaccuracies) of one of the calculation circuits (e.g., the calculation circuit being utilized to determine the BLC value for the image frame), and/or the continual or momentary failure or degradation of the dark pixel array 307.

The sanity check provides a check that the average black levels (e.g., of all the color channels for a given image frame) is within an expected range. More specifically, an alarm signal is asserted when an average of the black level value is outside of an estimated black level range. The estimated black level range is based on one or more operational parameters 340 of the image sensor and/or imaging system such as at least one of a temperature, gain, or exposure value of the image sensor (e.g., when capturing the image frame). Several modes of failure may be covered by checking if the average of the black level value is outside of the estimated black level range including, but not limited to, generic "stuck at" faults associated with any one or combination of ADC operation, column memory (e.g., ASRAM), any of the functional blocks described in process 300 or otherwise, as well as dark pixel array 307 being compromised.

After, or in parallel with, the flicker/sanity check of block 341, the BLC values 343 are passed to block 339 and are utilized via pixel correction circuitry (e.g., pixel correction circuitry 139 of FIG. 1B) to adjust the one or more image signals (e.g., associated with image pixel stream 310) to provide black level correction. In one embodiment, the pixel correction circuitry may subtract the BLC value from the image signal on a per color channel basis (e.g., the BLC value associated with a red color channel would be subtracted from or otherwise used to adjust the image signals associated with the red color channel of the image frame). In some embodiments, there may be multiple pixel correction circuits that are each associated with a respective color channel of the imaging system. Once the image signals of the image pixel stream 310 are corrected, the image data is output by the pixel correction circuitry (e.g., to be stored in memory, output on a display, or otherwise).

Figure 4A:
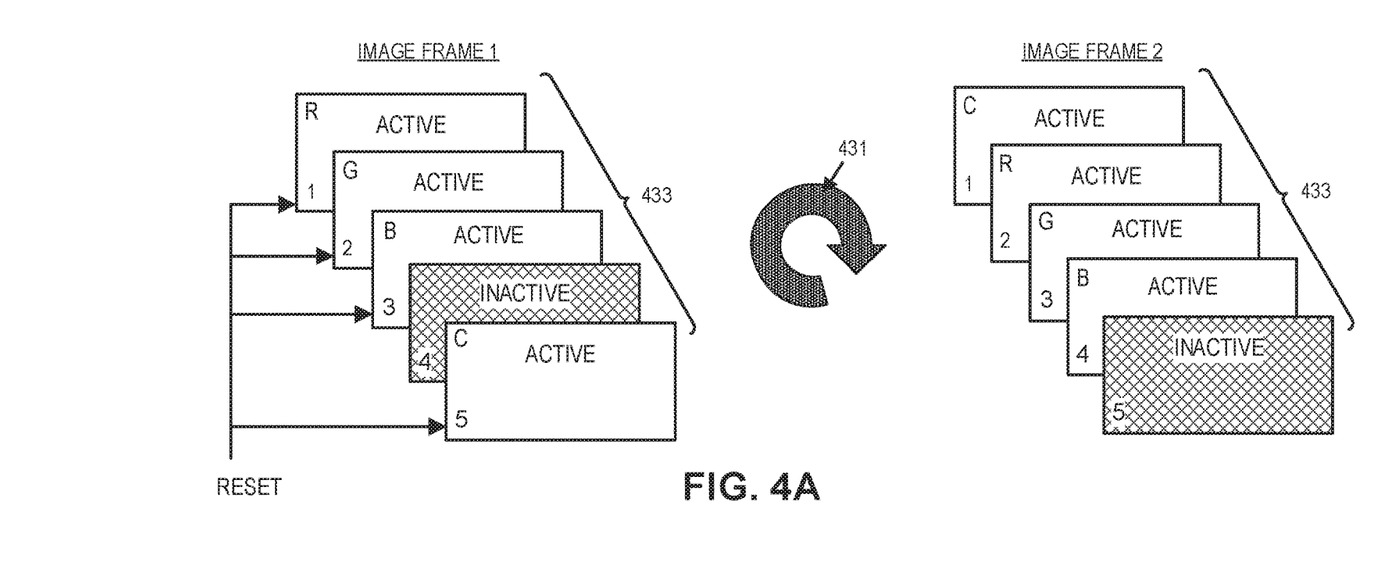
FIGS. 4A-4B illustrate exemplary functional block diagrams of a reset and rotate scheme for self-testing black level correction, in accordance with the teachings of the present disclosure.
Figure 4B:
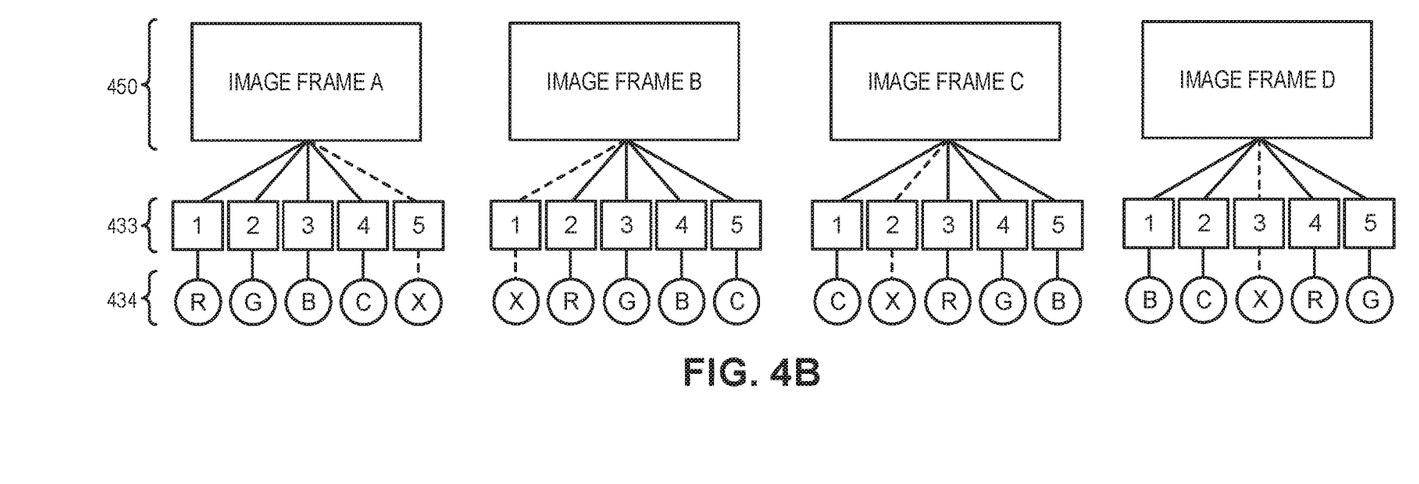

FIGS. 4A-4B illustrate exemplary functional block diagrams of a reset and rotate scheme for self-testing black level correction, in accordance with the teachings of the present disclosure. The reset and rotate schemes illustrated in FIGS. 4A-4B are non-limiting exemplary schemes of how a plurality of measurement circuits may be assigned to cover measurement (e.g., readout) of the black level value for one or more color channels of an imaging system via routing circuitry when capturing one or more image frames. Thus, the illustrated embodiments may be implemented in imaging systems, processes, or otherwise for self-testing black level correction in accordance with the teachings of the present disclosure, such as, but not limited to, imaging system 100 of FIGS. 1A-1B, process 300 illustrated in FIG. 3, and the like.

FIG. 4A illustrates reading out the black level value via measurement circuitry 433 (e.g., corresponding to measurement circuit 133 of FIG. 1B) for two immediately successive image frames, image frame 1 and image frame 2. During capture of image frame 1, measurement circuits 433-1, 433-2, 433-3, and 433-5 are respectively and selectively assigned to read out the black level value for the red, green, blue, and panchromatic color channels of the imaging system, while measurement circuit 433-4 is not assigned to a particular color channel and is instead inactive (or otherwise considered redundant for image frame 1). In other words, the one or more individual channels of the black reference signal (e.g., corresponding to the color channels of the imaging system) are assigned to a respective one of the individual measurement circuits 433. After readout of the black level values, a reset signal from a controller (e.g., control circuitry 126 of controller 120 of FIG. 1B) is sent to the active (or all, in some embodiments) measurement circuits 433 to clear the accumulated black levels followed by selective assignment for the next image frame (i.e., image frame 2).

The selective assignment may be performed, at least in part, by routing circuitry 431 (e.g., routing circuitry 131 illustrated in FIG. 1B), such that the specific assignment to the measurement circuits 433 is not identical between successive image frames. In other words, the selective assignment of the individual measurement circuits for an image frame (e.g., the image frame 2) is different than a previous selective assignment of the individual measurement circuits for an immediately prior image frame (e.g., the image frame 1). In some embodiments, the selective assignment may be random or nonrandom. In the same or other embodiments, the selective assignment follows a pre-determined order to evenly distribute inactivity of the individual measurement circuits 433 when capturing image frames. In the illustrated embodiment of FIG. 4A, the routing circuitry 431 selectively assigns the individual panchromatic, red, green, and black channels of the black reference signal to be readout by measurement circuits 433-1, 433-2, 433-3, and 433-4, respectively, during capture of the image frame 2, while measurement circuit 433-5 is inactive.

FIG. 4B illustrates a reset and rotate scheme in which the routing circuitry (e.g., routing circuitry 131 of FIG. 1B) selectively assigns individual channels 434 of the black reference signal to the measurement circuits 433 in a non-limiting and exemplary predetermined manner when capturing image frames 450. The predetermined order may be considered a linear order in which the measurement circuit that is inactive linearly changes from successive image frames. Specifically, as illustrated in FIG. 4B, the inactive measurement circuit (represented by the label "X") for image frame A, B, C, and D respectively changes to measurement circuit 433-5, 433-1, 433-2, 433-3, and so on. This linear change in inactive measurement circuit may continuously cycle in the pre-determined order until successive image capture is completed. Similarly, the individual channels of the black reference signal are also linearly cycled. As illustrated, the individual channel associated with the black level value of the red color channel of the imaging system is selectively assigned from measurement circuit 433-1 for image frame A, 433-2 for image frame B, 433-3 for image frame C, and so on. A similar linear change for the other individual channels of the black reference signal (e.g., associated with the black level value of the green, blue, or panchromatic color channels of the imaging system) may also be utilized. However, in other embodiments, the individual channels of the black reference signal may be randomly assigned while the assignment of the inactive measurement circuit rotates linearly (or otherwise) through the measurement circuits 433.

Figure 5:
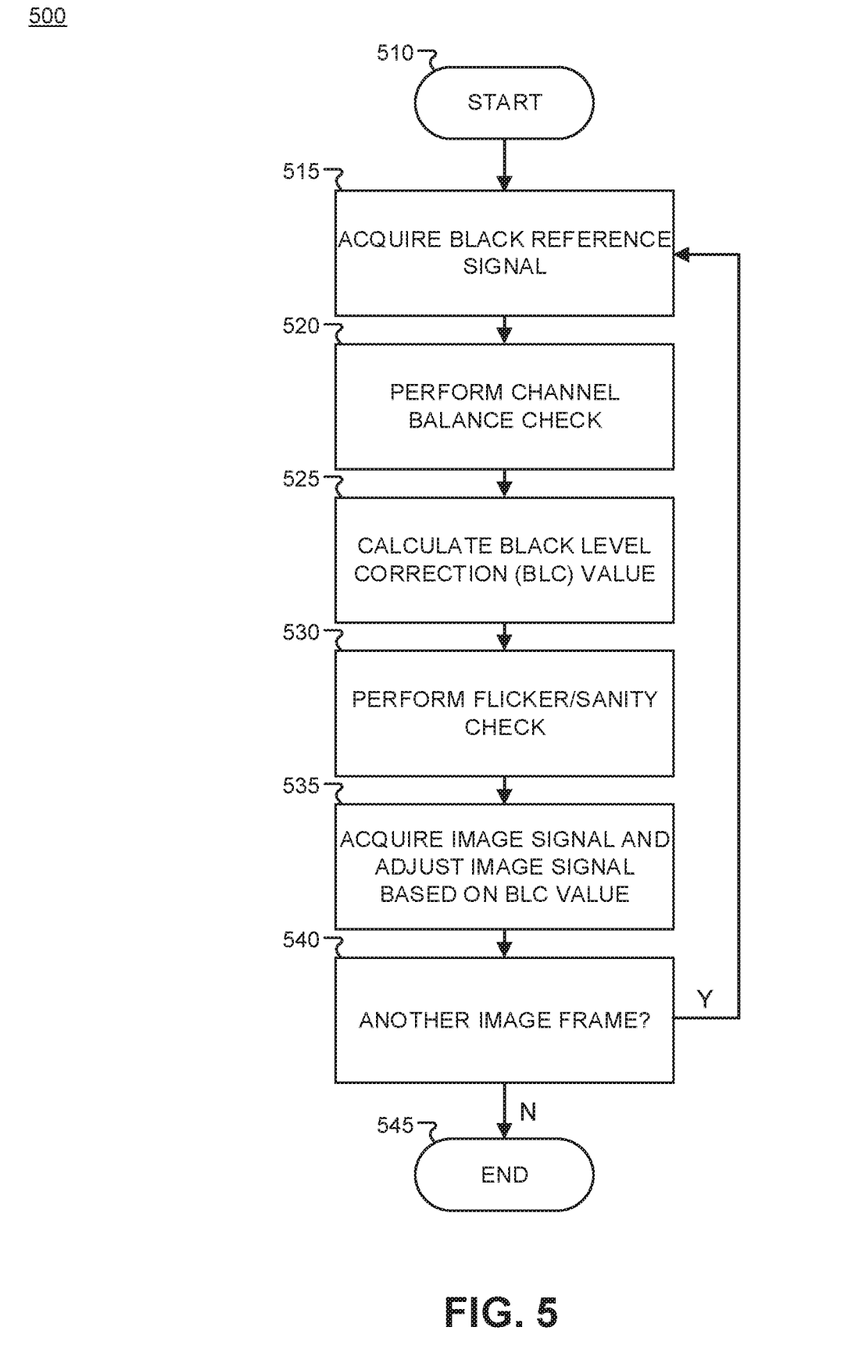
FIG. 5 shows a method for capturing image frames while self-testing black level correction, in accordance with the teachings of the present disclosure.

FIG. 5 shows a method 500 for capturing image frames while self-testing black level correction, in accordance with the teachings of the present disclosure. Method 500 is one possible implementation an imaging system (e.g., imaging system 100 illustrated in FIGS. 1A-1B) may use for self-testing black level correction. It is appreciated that the numbered blocks of method 500, including blocks 510-545, may occur in any order and even in parallel. Additionally, blocks may be added to, or removed from, method 500 in accordance with the teachings of the present disclosure.

Block 510 illustrates initializing an imaging system for capturing one or more image frames. Initialization may occur upon receipt of a start signal (e.g., corresponding to a depressed shutter button of a camera, transitioning to a reverse drive mode of an automobile, or otherwise) in which a system self-check may be performed to verify the imaging system is initially operable. This may include, for example, inserting a digital test pattern into an image pixel stream that may be compared with an upstream digital test pattern checker to check for correction failure (e.g., of pixel correction circuitry 139 illustrated in FIG. 1B or other components of the imaging system). This may also include resetting register values to arbitrary values (or required specific values) so that an alarm condition does not exist at initialization upon success of the system self-test.

Block 515 shows acquiring a black reference signal representative of a black level value of an image sensor (e.g., imaging system 100 illustrated in FIGS. 1A-1B) for the image frame. In some embodiments, the black reference signal is a multi-channel signal with individual channels associated with a corresponding color channel including in a plurality of color channels of the image sensor. Acquiring the black reference signal includes selective assignment and readout. During selective assignment, the individual channels of the black reference signal are selectively assigned to individual measurement circuits including in a plurality of measurement circuits (e.g., measurement circuitry 133 illustrated in FIG. 1B) where a total number of the plurality of measurement circuits is greater than a total number of the plurality of color channels (e.g., during capture of the image frame, at least one of the measurement circuits is inactive). Readout includes reading out the black reference signal from the image sensor with the plurality of measurement circuits to determine the black level value for each of the plurality of color channels associated with the image frame (e.g., red, green, blue, and panchromatic color channels). During the readout, one or more individual measurement circuits included in the plurality of measurement circuits is inactive based on the selective assignment of the individual measurement circuits.

In some embodiments, the selective assignment of the individual measurement circuits for the image frame is different than a previous selective assignment of the individual measurement circuits for an immediately prior image frame. In the same or other embodiments, the selective assignment of the individual measurement circuits is random. In one embodiment, the selective assignment of the individual measurement circuits for the image frame is nonrandom such that the one or more individual measurement circuits that are inactive during the readout of black reference signal for the image frame are different relative to the immediately prior image frame.

Block 520 illustrates performing a channel balance check, including comparing the black level value of each of the plurality of color channels associated with the image frame with each other to determine whether a difference between the black level value for each of the plurality of color channels is within a channel balance threshold. When the difference is outside of the channel balance threshold an alarm is asserted, which may notify a user of the imaging system or some other individual of an occurrence of a failure or degradation condition of the imaging system.

Block 525 shows calculating a black level correction (BLC) value of the image frame. This includes selectively associating an individual calculation circuit including in a plurality of calculation circuits (e.g., calculation circuitry 137 illustrated in FIG. 1B) with the image frame. After the selective association, the BLC value of the image frame is calculated with the individual calculation circuit based, at least in part, on the black level value determined from the plurality of measurement circuits. In some embodiments the individual calculation circuit is a different one of the plurality of calculation circuits selectively associated for an immediately prior image frame.

Block 530 illustrates performing a flicker and/or sanity check. The flicker check includes comparing the BLC value of the image frame with a previous BLC value of an immediately prior image frame to determine whether a difference between the BLC value and the previous BLC value is within a flicker threshold. When the difference is outside of the flicker threshold, an alarm is asserted, which may notify a user of the imaging system or some other individual of an occurrence of a failure or degradation condition of the imaging system. The sanity check includes receiving one or more operational parameters of the image sensor when capturing the image frame, wherein the one or more operational parameters include at least one of a temperature of the image sensor, a gain of the image sensor, or an exposure of the image sensor. After receiving the one or more operational parameters, an estimated black level range for the image sensor associated with the image frame is determined based, at least in part, on the operational parameters and the average of the black level value of the image sensor is compared to the estimated black level range. When the average of the black level value of the image sensor, which includes the black level value of the image frame, is outside of the estimated black level range, an alarm is asserted, which may notify a user of the imaging system or some other individual of an occurrence of a failure or degradation condition of the imaging system.

Block 535 shows acquiring an image signal and adjusting the image signal based on the BLC value. The image signal may be readout by readout circuitry (e.g., readout circuitry 128 of FIG. 1B), which may be different than the measurement circuitry. However, in other embodiments, the measurement circuitry itself may be utilized to readout the image signal. The image signal may correspond to an image pixel stream in which each of the image pixels are readout (e.g., row by row, simultaneously, or otherwise). The image signals are collectively representative of the image frame and are each adjusted based, at least in part, on the BLC value to provide black level correction. In some embodiments the adjustment is on a per color channel basis (e.g., the BLC value associated with the red color channel of the imaging system is utilized to adjust the image signal that is also associated with the red color channel). The adjustment may correct to subtracting (or adding) the BLC value to image signal. In other embodiments, an average BLC value (e.g., an averaged value of the BLC value of each of the color channels) is utilized to correct the image signals or a collective or per color channel basis. In other words, in some embodiments, the image signals associated with a given image frame or exposure may be corrected with a common BLC value that may correspond or otherwise be related to an average BLC value of each of the individual color channels.

Block 540 illustrates checking to see if another image frame should be captured (e.g., when capturing a video). If another image frame is to be captured, block 540 proceeds to block 515. If image frame acquisition has completed, block 540 proceeds to block 545 signaling an end of method 500.

The processes explained above may be implemented using software and/or hardware. The techniques described may constitute machine-executable instructions embodied within a tangible or non-transitory machine (e.g., computer) readable storage medium, that when executed by a machine (e.g., controller 120 of FIG. 1A) will cause the machine to perform the operations described. Additionally, the processes may be embodied within hardware, such as an application specific integrated circuit ("ASIC"), field programmable gate array (FPGA), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging system, comprising:
   an image sensor including an image pixel array and a dark pixel array, wherein the image pixel array is adapted to generate an image signal in response to incident light, wherein the dark pixel array is adapted to generate a black reference signal representative of a black level value of the image sensor; and
   black level correction (BLC) circuitry to adjust the image signal of the image pixel array based, at least in part, on the black reference signal of the dark pixel array, the BLC circuitry including:
      a plurality of measurement circuits to readout the black reference signal from the dark pixel array to determine the black level value of the image sensor, wherein a total number of the plurality of measurement circuits is greater than a total number of color channels of the image sensor; and
      a plurality of calculation circuits to calculate a BLC value based, at least in part, on the black level value determined from the plurality of measurement circuits.

2. The imaging system of claim 1, wherein the image sensor includes one or more color channels, and wherein the black reference signal includes one or more individual channels, each of the individual channels associated with a respective one of the one or more color channels of the image sensor.

3. The imaging system of claim 2, further comprising:
   routing circuitry coupled to the image sensor and the plurality of measurement circuits to selectively assign the one or more individual channels of the black reference signal to individual measurement circuits included in the plurality of measurement circuits for readout of the black reference signal, wherein at least one of the plurality of measurement circuits is inactive during the readout of the black reference signal when capturing an image frame.

4. The imaging system of claim 3, wherein the routing circuitry rotates through the plurality of measurement circuits in a predetermined order when selectively assigning the one or more individual channels of the black reference signal to the individual measurement circuits to evenly distribute inactivity of the individual measurement circuits when capturing image frames, including the image frame.

5. The imaging system of claim 3, wherein the selective assignment to the plurality of measurement circuits provided by the routing circuitry is random, and wherein the selective assignment between successive image frames is not identical.

6. The imaging system of claim 1, further comprising routing circuitry coupled to the plurality of calculation circuits to selectively assign individual calculation circuits included in the plurality of calculation circuits to calculate the BLC value such that the individual calculation circuits determining the BLC value of successive image frames are different.

7. The imaging system of claim 1, further comprising:
an interface device to receive an alarm signal and in response provide an indication of an error occurrence to a user of the imaging system when the alarm signal is asserted.

8. The imaging system of claim 7, further comprising:
channel balance check logic coupled to the interface device to assert the alarm signal when a comparison between the black level value for each of a plurality of color channels associated with an image frame of the image sensor is outside a channel balance threshold.

9. The imaging system of claim 7, further comprising:
flicker check logic coupled to the interface device to assert the alarm signal when a comparison of the BLC value between successive image frames results in a difference outside of a flicker threshold.

10. The imaging system of claim 7, further comprising:
sanity check logic coupled to the interface device to assert the alarm signal when an average of the black level value is outside of an estimated black level range, wherein the estimated black level range is based on one or more operational parameters of the image sensor that include at least one of a temperature, gain, or exposure value of the image sensor.

11. The imaging system of claim 1, further comprising:
pixel correction circuitry to adjust the image signal based, at least in part, on the BLC value to provide black level correction.

12. A method for black level correction (BLC) when capturing an image frame, the method comprising:
acquiring a black reference signal representative of a black level value of an image sensor for the image frame, wherein the black reference signal is a multi-channel signal with individual channels associated with a corresponding color channel included in a plurality of color channels of the image sensor, wherein acquiring the black reference signal includes:
selectively assigning the individual channels of the black reference signal to individual measurement circuits included in a plurality of measurement circuits, wherein a total number of the plurality of measurement circuits is greater than a total number of the plurality of color channels; and
reading out the black reference signal from the image sensor with the plurality of measurement circuits to determine the black level value of each of the plurality of color channels associated with the image frame, wherein one or more individual measurement circuits included in the plurality of measurement circuits is inactive during the readout based on the selective assignment of the individual measurement circuits.

13. The method of claim 12, wherein the selective assignment of the individual measurement circuits for the image frame is different than a previous selective assignment of the individual measurement circuits for an immediately prior image frame.

14. The method of claim 13, wherein the selective assignment of the individual measurement circuits for the image frame is random.

15. The method of claim 13, wherein the selective assignment of the individual measurement circuits for the image frame is nonrandom, and wherein the one or more individual measurement circuits that are inactive during the readout of black reference signal for the image frame are different relative to the immediately prior image frame.

16. The method of claim 12, further comprising:
comparing the black level value of each of the plurality of color channels associated with the image frame with each other to determine whether a difference between the black level value for each of the plurality of color channels is within a channel balance threshold; and
asserting an alarm when the difference is outside of the channel balance threshold.

17. The method of claim 12, further comprising:
selectively associating an individual calculation circuit included in a plurality of calculation circuits with the image frame; and
calculating a BLC value of the image frame with the individual calculation circuit based, at least in part, on the black level value determined from the plurality of measurement circuits.

18. The method of claim 17, wherein the individual calculation circuit is a different one of the plurality of calculation circuits selectively associated for an immediately prior image frame.

19. The method of claim 17, further comprising:
comparing the BLC value of the image frame with a previous BLC value of an immediately prior image frame to determine whether a difference between the BLC value and the previous BLC value is within a flicker threshold; and
asserting an alarm when the difference is outside of the flicker threshold.

20. The method of claim 17, further comprising:
adjusting an image signal representative of the image frame based, at least in part, on the BLC value to provide black level correction.

21. The method of claim 12, further comprising:
receiving one or more operational parameters of the image sensor when capturing the image frame, wherein the one or more operational parameters include at least one of a temperature of the image sensor, a gain of the image sensor, or an exposure of the image sensor;
determining an estimated black level range for the image sensor associated with the image frame based, at least in part, on the operational parameters; and asserting an alarm when an average of the black level value of the image sensor, which includes the black level value of the image frame, is outside of the estimated black level range.

\* \* \* \* \*